United States Patent
Lai et al.

(10) Patent No.: US 10,325,462 B2
(45) Date of Patent: Jun. 18, 2019

(54) WIRELESS MOTION MONITORING SYSTEM AND METHOD THEREOF

(71) Applicant: Arwin Technology Limited, Hong Kong (HK)

(72) Inventors: Ming On Lai, Hong Kong (HK); Wai Man Raymond Choi, Hong Kong (HK); Yeung Tung Tse, Hong Kong (HK)

(73) Assignee: Arwin Technology Limited, Hong Kong (HK)

(*) Notice: Subject to any disclaimer, the term of this patent is extended or adjusted under 35 U.S.C. 154(b) by 9 days.

(21) Appl. No.: 15/605,992

(22) Filed: May 26, 2017

(65) Prior Publication Data

US 2017/0352235 A1 Dec. 7, 2017

Related U.S. Application Data

(60) Provisional application No. 62/345,007, filed on Jun. 3, 2016.

(51) Int. Cl.
*G08B 13/22* (2006.01)
*G08B 21/22* (2006.01)
(Continued)

(52) U.S. Cl.
CPC ............ *G08B 13/22* (2013.01); *G08B 13/08* (2013.01); *G08B 21/22* (2013.01); *G08B 25/08* (2013.01);
(Continued)

(58) Field of Classification Search
CPC ........ G08B 21/22; G08B 13/08; H04W 4/027
See application file for complete search history.

(56) References Cited

U.S. PATENT DOCUMENTS

2016/0189531 A1* 6/2016 Modi .................. G08B 29/185
340/506
2016/0348398 A1* 12/2016 Telljohann .............. E05B 41/00
2017/0243456 A1* 8/2017 Smith ..................... G08B 13/02

FOREIGN PATENT DOCUMENTS

CN          103891201 A      6/2014

OTHER PUBLICATIONS

Search Report issued by the Chinese Patent Office dated Sep. 23, 2016.

* cited by examiner

*Primary Examiner* — Hongmin Fan (57) ABSTRACT

The present disclosure described herein, a wireless motion monitoring system and method. The motion detection device may comprise at least two sensors, a microprocessor and a memory unit. The motion detection device comprises retrieving a first motion data and a second motion data, filtering noise data, transmitting the filtered motion data to a data processing device, calculating steady-state values and transmitting the steady-state values to the data processing device. The data processing device comprises receiving a first filtered motion data, a second filtered motion data and steady-state values, normalizing the first filtered motion data, calculating velocity and displacement, comparing the displacement with a pre-defined displacement threshold, verifying whether a difference between a last value in the second filtered motion data and the steady-state values is greater than a pre-defined threshold value, validating the movement of the motion detection device and updating a change in status of the motion detection device.

6 Claims, 9 Drawing Sheets

(51) Int. Cl.
  *G08B 13/08* (2006.01)
  *G08B 25/08* (2006.01)
  *H04W 4/80* (2018.01)
  *H04W 4/02* (2018.01)
  *H04W 52/02* (2009.01)
  *H04L 29/08* (2006.01)
(52) U.S. Cl.
  CPC ............. *H04W 4/027* (2013.01); *H04W 4/80* (2018.02); *H04W 52/0254* (2013.01); *H04L 67/26* (2013.01); *Y02D 70/00* (2018.01); *Y02D 70/142* (2018.01); *Y02D 70/144* (2018.01); *Y02D 70/26* (2018.01)

Fig. 9

WIRELESS MOTION MONITORING SYSTEM AND METHOD THEREOF

CROSS-REFERENCE TO RELATED APPLICATIONS AND PRIORITY

The present application claims priority from U.S. Provisional Patent Application No. 62/345,007 dated Jun. 3, 2016, the entirety of which is incorporated herein by a reference.

TECHNICAL FIELD

The present application, in general, relates to a wireless motion monitoring system and a method thereof.

BACKGROUND

A lot of motion monitoring devices and their corresponding assemblies are attached on doors and windows for their respective usage. A motion sensor (or motion detector) is the linchpin of a security system, because the motion monitoring device continuously monitors and detects when an unauthorised person is inside or enters a home. The motion sensor uses one or multiple technologies to detect movement in an area. If a sensor is tripped, a signal is sent to the security system's control panel, which connects to the monitoring centre, alerting the concerned person and the monitoring centre about a potential threat in the premises.

However, the sensors and motion monitoring devices available today are not fool proof and can be trespassed very easily. Further, many valuable things kept at pedestal, drawers or any other storage compartments are not protected or are never detected or monitored continuously with any kind of respective motions. Any motion in any type of abovementioned devices is not monitored and further theft from the abovementioned devices is not detected.

SUMMARY

Before the present devices, systems and methods and systems along with components related thereto are described, it is to be understood that this application is not limited to the particular methods, devices, systems and their arrangement as described, as there can be multiple possible embodiments which are not expressly illustrated in the present application but may still be practicable within the scope of the invention. It is also to be understood that the terminology used in the description is for the purpose of describing the particular versions or embodiments only, and is not intended to limit the scope of the present application. This summary is provided to introduce concepts related to devices and methods for wireless motion monitoring of objects and the concepts are further described below in the detailed description. This summary is not intended to identify essential features of the claimed subject matter nor it is intended for use in determining or limiting the scope of the claimed subject matter.

In one implementation, a motion detection device is described herein. The motion detection device may comprise at least two sensors, a microprocessor electronically coupled with the at least two sensors and a memory unit coupled with the microprocessor. The microprocessor may be capable of executing programmed instructions stored in the memory unit. In one embodiment, the microprocessor may execute a programmed instruction for retrieving a first motion data and a second motion data from a first sensor and a second sensor respectively. In one aspect, the first motion data and the second motion data are associated to motion of the motion detection device along at least one axis. The microprocessor may further execute a programmed instruction for filtering noise data from the first motion data and the second motion data to generate a first filtered motion data and a second filtered motion data respectively. Further, the microprocessor may execute a programmed instruction for transmitting the first filtered motion data and the second filtered motion data to a data processing device in communication with the wireless motion detection device. In one aspect, the first filtered motion data and the second filtered motion data are transmitted until the motion of the motion detection device is determined to be stopped. The microprocessor may further execute a programmed instruction for calculating steady-state values corresponding to the at least one axis after the motion of the motion detection device is stopped, wherein the steady-state values are calculated based upon the first filtered motion data and the second filtered motion data. Further, the microprocessor may execute a programmed instruction for transmitting the steady-state values to the data processing device wherein the steady-values in combination with the first filtered motion data and the second filtered motion data facilitates in determining status of the motion detection device.

In another implementation, a data processing device is described herein. The data processing device may comprise a processor and a memory coupled with the processor. The processor may be capable of executing programmed instructions stored in the memory. In one embodiment, the processor may execute a programmed instruction for receiving, from a motion detection device in communication with the data processing device, a first filtered motion data, a second filtered motion data and steady-state values associated to motion of the motion detection device along at least one axis. The processor may further execute a programmed instruction for normalizing the first filtered motion data by subtracting the steady-state values from the first filtered motion data along the at least one axis to obtain normalized filtered motion data. Further, the processor may execute a programmed instruction for calculating velocity and displacement based upon the normalized filtered motion data along the at least one axis. The processor may further execute a programmed instruction for comparing the displacement on the at least one axis with a pre-defined displacement threshold value in order to determine type of motion of the motion detection device. The data processing device may comprise verifying whether a difference between a last value in the second filtered motion data and the steady-state values along the at least one axis is greater than a pre-defined threshold value. Further, the data processing device may comprise validating the movement of the motion detection device if the difference between the last value in the second filtered data and the steady state values is greater than the pre-defined threshold value. The data processing device may comprise updating a change in status of the motion detection device based upon the validation of the movement of the motion detection device.

In yet another implementation, a wireless motion monitoring method is described herein. The method may comprise retrieving, via a microprocessor of a motion detection device, a first motion data and a second motion data from a first sensor and a second sensor respectively. In one aspect, the first motion data and the second motion data may be associated to motion of the motion detection device along at least one axis. The method may further comprise filtering, via the microprocessor, noise data from the first motion data and the second motion data to generate a first filtered motion data and a second filtered motion data respectively. Further, the method may comprise transmitting, via the microprocessor, the first filtered motion data and the second filtered motion data to a data processing device in communication with the wireless motion detection device. In one aspect, the first filtered motion data and the second filtered motion data may be transmitted until the motion of the motion detection device is determined to be stopped. The method may further comprise calculating, via the microprocessor, steady-state values corresponding to the at least one axis after the motion of the motion detection device is stopped, wherein the steady-state values are calculated based upon the first filtered motion data and the second filtered motion data. The method may comprise transmitting, via the microprocessor, the steady-state values to the data processing device. The method may comprise receiving, via a processor of the data processing device, the first filtered motion data, the second filtered motion data and the steady-state values associated to motion of the motion detection device along at least one axis. Further, the method may comprise verifying, via the processor, whether a difference between a last value in the second filtered motion data and the steady-state values along the at least one axis is greater than a pre-defined threshold value. The method may further comprise validating, via the processor, the movement of the motion detection device if the difference between the last value in the second filtered data and the steady state values is greater than the pre-defined threshold value. Further, the method may comprise updating, via the processor, a change in status of the motion detection device based upon the validation of the movement of the motion detection device.

BRIEF DESCRIPTION OF THE FIGURES

The detailed description is described with reference to the accompanying Figures. In the Figures, the left-most digit(s) of a reference number identifies the Figure in which the reference number first appears. The same numbers are used throughout the figures to refer like features and components.

DETAILED DESCRIPTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Some embodiments of this application, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any apparatuses, devices and methods similar or equivalent to those described herein can be used in the practice or testing of embodiments of the present application, the exemplary, apparatuses, devices and methods are now described. The disclosed embodiments are merely exemplary of the application, which may be embodied in various forms.

Various modifications to the embodiments will be readily apparent to those skilled in the art and the generic principles herein may be applied to other embodiments. However, one of ordinary skill in the art will readily recognize that the present application is not intended to be limited to the embodiments illustrated, but is to be accorded the widest scope consistent with the principles and features described herein.

The present application relates to wireless motion monitoring system(s) and method(s) thereof. A motion monitoring device may be attached to any object whose motion is to be monitored for determining unauthorized intrusion and/or trespassing on the object. The motion monitoring device may comprise an accelerometer sensor and a magnetometer sensor for determining status associated to the motion monitoring device and accordingly the motion of the object itself. The accelerometer sensor may sense motion data indicating movement of the motion monitoring device. The magnetometer sensor may sense angular motion of the motion monitoring device and accordingly validate the movement of the motion monitoring device. The motion monitoring device may consolidate data sensed by the accelerometer sensor and the magnetometer sensor and transmit the data consolidated to a data processing device communicatively coupled with motion monitoring device. The data processing device may process the data consolidated and determine status of the motion monitoring device. The status may include the motion monitoring device (and accordingly the object attached therewith) being opened, closed, and moved etc. The status may be updated on user's device through a backend server communicatively coupled with the data processing device.

While aspects of described system and method for wireless motion monitoring may be implemented in any number of different computing systems, environments, and/or configurations, the embodiments are described in the context of the following exemplary system.

Figure 1:
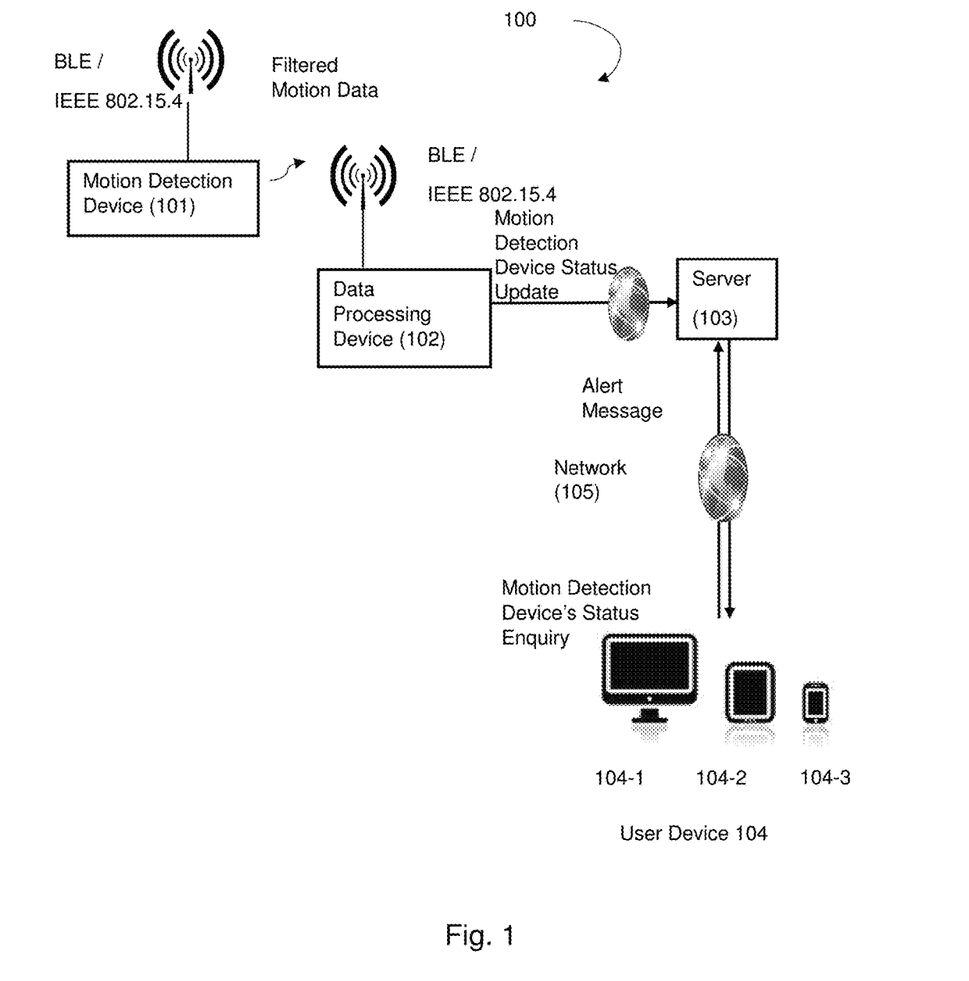
FIG. 1 illustrates a network implementation of system 100 for wirelessly monitoring a motion, in accordance with an embodiment of the present application.

Referring to FIG. 1, a network implementation of system 100 for wirelessly monitoring a motion is illustrated, in accordance with an embodiment of a present subject matter. As shown, the system 100 may include a motion detection device 101, a data processing device 102 and a server 103. Although the present application is explained considering that the server 103 is implemented as a back-end server, it may be understood that the server 103 may also be implemented in a variety of computing systems, such as a laptop computer, a desktop computer, a notebook, a workstation, a mainframe computer, a network server, and the like. In one implementation, the server 103 may be implemented in a cloud-based environment. It will be understood that the server 103 may be accessed by multiple users through one or more user devices 104-1, 104-2, 104-3 . . . 104-N, collectively also referred to as user devices 104 hereinafter, or applications residing on the user devices 104. Examples of the user devices 104 may include, but are not limited to, a portable computer, a personal digital assistant, a handheld device, a wearable device, a workstation and the like. The user devices 104 are communicatively coupled to the server 103 through a network 105.

In one implementation, the network 105 may be a wireless network, a wired network or a combination thereof. The network 105 can be implemented as one of the different types of networks, such as intranet, local area network (LAN), wide area network (WAN), the internet, and the like. The network 105 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 105 may include a variety of network devices, including routers, bridges, servers, computing devices, storage devices, and the like. In one implementation, a user may use the user device 104 to access the server 103. The user may register themselves in order to use the server 103.

In one embodiment, as shown in FIG. 1, the motion detection device 101 and the data processing device 102 may be located at the user's premises and the server 103 may be located at a remote location. The motion detection device 101 and the data processing device 102 may be connected wirelessly with low-power short range wireless protocol including, but not limited to, IEEE 802.15.4 or Bluetooth Low Energy (BLE) or the like. The data processing device 102 may be connected to the server via the network 105.

In accordance with embodiments of the present application, the motion detection device 101 may detect a first motion data and a second motion data and filter the noise data from the first motion data and second motion data to generate a first filtered motion data and a second filtered motion data respectively. The motion detection device 101 may further transmit the first filtered motion data and the second filtered motion data to the data processing device 102. The data processing device 102 may process the first filtered motion data and the second filtered motion data to determine status of the motion detection device 101 and update the status to the server 103. The server 103 may further send notifications indicating the status of the motion detection device 101 to the user on the user device 104. The working of the system 100 is explained in detail referring to FIGS. 2-9 as explained below.

Figure 2:
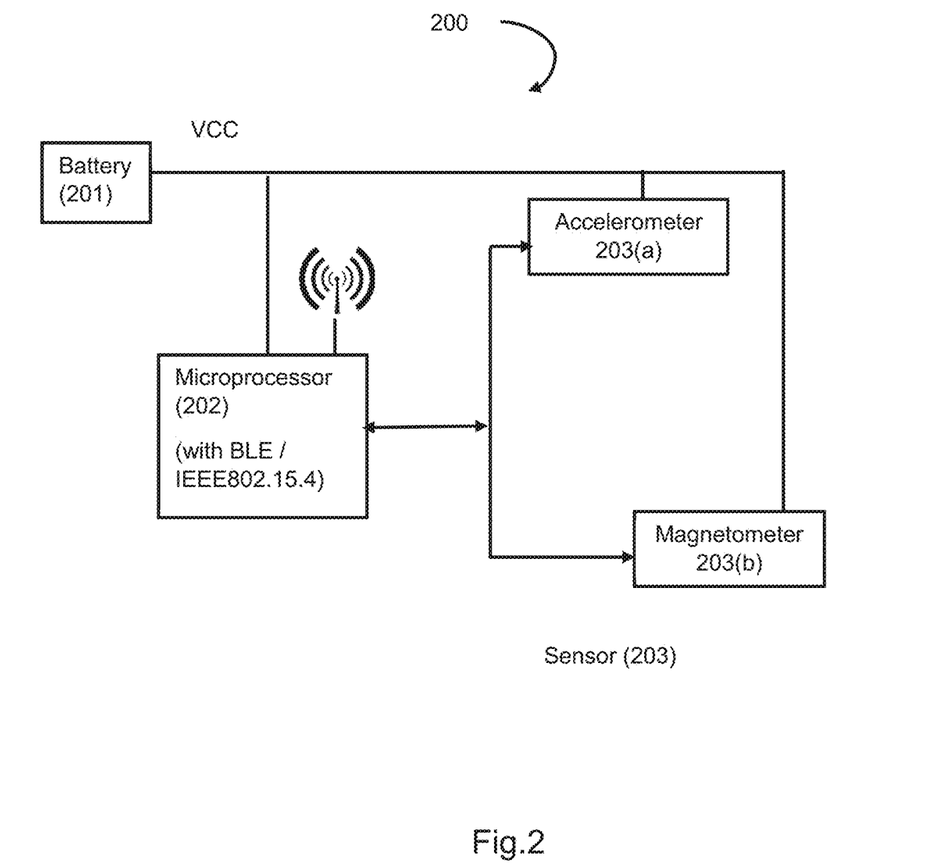
FIG. 2 illustrates a block diagram of a motion detection device 101, in accordance with an embodiment of the present application.

Referring to FIG. 2, a block diagram of a motion detection device 101 is illustrated, in accordance with an embodiment of a present subject matter. As shown in FIG. 2, the motion detection device 101 may be powered by a small battery 201 having a shape similar to that of a coin-cell, watch cell, or the like. In one embodiment, the motion detection device 101 may have dimensions of 100 mm×100 mm×15 mm. The motion detection device 101 may further comprise a microprocessor 202 and at least two MEMS (Micro-Electronic Mechanical System) sensors used to detect motion of the motion detection device 101. The at least two MEMS sensors 203 may include an accelerometer 203(a), a magnetometer 203(b), or the like. Hereinafter, the accelerometer 203(a) and the magnetometer 203(b) may be collectively referred as at least two sensors 203 or the sensors 203 interchangeably. The at least two sensors 203 may be connected to the microprocessor 202 via an I2C (Inter-IC) bus with a clock line and a data line (not shown). The microprocessor 202 may configure the one or more sensors and fetch the plurality of motion data via the I2C bus. The I2C bus is a bi-directional two-wire serial bus that provides a communication link between Integrated Circuits (ICs).

Figure 3:
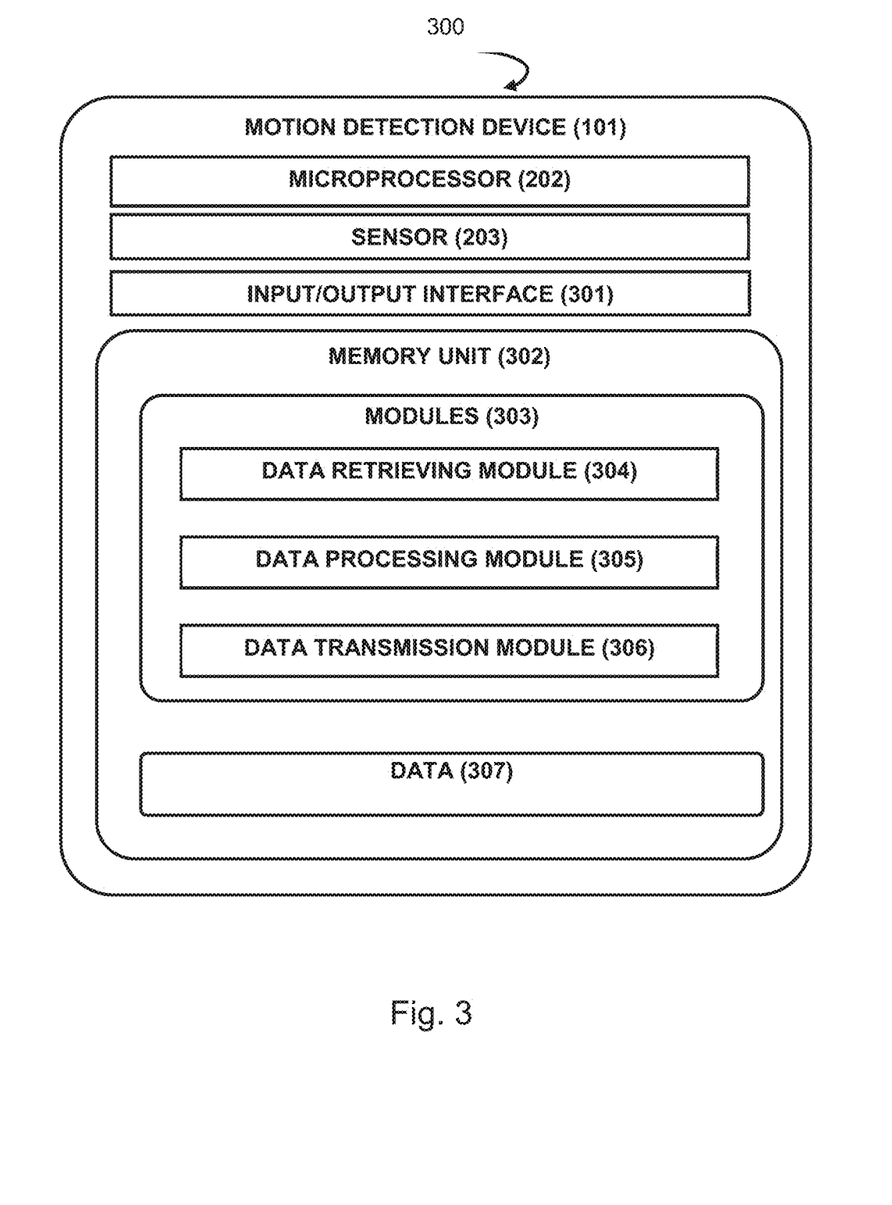
FIG. 3 illustrates an architecture of the motion detection device 101, in accordance with an embodiment of the present application.

Now referring to FIG. 3, an architecture of the motion detection device 101 is illustrated, in accordance with the embodiment of the present subject matter. As shown, the motion detection device 101 may include at least one microprocessor 202, the sensors 203, an input/output (I/O) interface 301, a memory unit 302, modules 303 and data 307. In one embodiment, the at least one microprocessor 202 is configured to fetch and execute computer-readable and/or programmed instructions stored in the memory unit 302.

In one embodiment, the I/O interface 301 may include a variety of software and hardware interfaces, for example, a web interface, a graphical user interface, and the like. The I/O interface 301 may allow the motion detection device 101 to communicate with the data processing device 102 and other computing devices, such as web servers and external data servers (not shown). The I/O interface 301 can facilitate multiple communications within a wide variety of networks and protocol types, including wired networks, for example, LAN, cable, etc., and wireless networks, such as WLAN, cellular, or satellite IEEE 802.15.4 or Bluetooth Low Energy (BLE), or the like. The I/O interface 204 may include one or more ports for connecting a number of devices to one another or to another server In an implementation, the memory unit 302 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and memory cards. The memory unit 302 may include the modules 303 and the data 307.

In one embodiment, the modules 303 includes routines, programs, objects, components, data structure, etc., which performs particular tasks, functions or implement abstract data types. In one implementation, the modules 303 may include a data retrieving module 304, a data processing module 305, and a data transmission module 306.

In one embodiment, the microprocessor 202 may initialize the at least two sensors 203. Further, in order to extend the battery life and to reduce the power consumption, initially, the magnetometer 203(b) and the microprocessor 202 may be configured to operate in sleep mode when there is no motion in the motion detection device 101. Further, the accelerometer 203(a), though active, may be configured to operate in a lower power mode by lowering sampling rate when there is no motion. Such operation of the microprocessor 202 along with the magnetometer 203(b) and the accelerometer 203(a) in the sleeping mode and the low power mode prevents any Radio Frequency (RF) transmission and thereby facilitates in minimizing the power consumption and extending the battery life of the battery 201.

In one embodiment, the accelerometer 203(a) may detect movement of the motion detection device 101 by continuously capturing a first motion data (also referred hereinafter as accelerometer data) associated to motion/movement of the motion detection device 101. In an embodiment, if the first motion data captured by the accelerometer 203(a) exceeds a predefined threshold value, the accelerometer 203(a) detects the motion/movement of the motion detection device 101 and accordingly triggers the microprocessor 202 and the magnetometer 203(b) to switch from the sleeping mode to a normal mode. Further, the accelerometer 203(a) may be switched from the low power mode to a normal mode. In one embodiment, the accelerometer 203(a) may thereafter continue to capture the first motion data whereas the magnetometer 203(b) may capture second motion data (also referred hereinafter as angular motion data) associated to motion/movement of the motion detection device 101. Further, the microprocessor 202 may execute the modules 303 to retrieve and process the first motion data and the second motion data, the details of which are explained hereinafter as below by referring to FIG. 4.

In one embodiment, based upon the detection of the motion/movement of the motion detection device 101, the data retrieving module 304 may be configured to retrieve the first motion data and the second motion data from the accelerometer 203(a) and the magnetometer 203(b) respectively, wherein the first motion data and the second motion data may be associated to the motion/movement of the motion detection device along at least one axis.

In one embodiment, the data processing module 305 may process the first motion data and the second motion data. The data processing module 305 may filter noise data from the first motion data and the second motion data to generate a first filtered motion data and a second filtered motion data respectively. Specifically, the data processing module 305 may perform low-pass filtering on the first motion data retrieved from the accelerometer 203(a) in order to minimize the effect of noise. The noise data from the first motion data may be filtered based upon an Infinite Impulse Response (IIR) filtering technique implementing following formula:

$$x'[n] = a_0 x[n] + b_1 x'[n-1] \quad (1)$$

Where, x[n] is the first motion data,
x'[n] is the first filtered motion data,
$a_0 = 1 - e^{-2\pi f_c}$ and $b_1 = e^{-2\pi f_c}$ and
'fc' is the cut-off frequency of the filter having a value between 0 and 0.5.

In one embodiment, the data processing module 305 may filter the noise data from the second motion data based upon moving average filtering technique implementing following formula:

$$\bar{x}[n] = \frac{1}{N} \sum_{k=0}^{N-1} x[n-k] \quad (2)$$

Where, $\bar{x}[n]$ is the second filtered motion data and
'N' is the number of values to average.

In one embodiment, the data transmission module 306 may transmit the first filtered motion data and the second filtered motion data to a data processing device 102 in communication with the wireless motion detection device 101, wherein the first filtered motion data and the second filtered motion data may be transmitted until the motion of the motion detection device 101 is determined to be stopped.

In one embodiment, the first filtered motion data and the second filtered motion data may be transmitted at multiple time slots. In one embodiment, the data from the sensors are in 16-bit format in order to maintain the resolution for the data from the sensors. Therefore, this may result in generation of 48 bits or 6 bytes of data from each sensor on each time slot. This is because, each sensor may capture data from three axes (i.e. x, y and z) ultimately resulting into the overall data of 96 bits or 12 bytes from two sensors. Further, such data may further increase to 144 bits or 18 bytes when the data is captured from three sensors. The transmission of such humongous data to the data processing device may result in computational overhead and thereby resulting in high computational time and low computational speed.

Therefore, in order to minimize overall data being transmitted to the data processing device 102, at the first-time slot, the first filtered motion data and the second filtered motion data may be transmitted in full 16-bit format to the data processing device 102. However, the transmission for a second-time slot and subsequent time slots thereafter, difference of the first filtered motion data captured at a current time slot and the first filtered motion data captured at a previous time slot may be transmitted from the motion detection device 101. Similarly, the transmission for the second-time slot and the subsequent time slots thereafter, difference of the second filtered motion data captured at the current time slot and the second filtered motion data captured at the previous time slot may be transmitted from the motion detection device 101. The data processing device 102 may easily retrieve the differential data by adding the difference to the previous data. Since the difference between two consecutive data is relatively small, the data for the second-time slot and subsequent times slots may be transmitted in 8-bit format thereby resulting in conservation of half of the wireless bandwidth.

In one embodiment, the data processing module 305 may calculate a standard deviation of the first filtered motion data corresponding to the at least one axis received from the accelerometer 203(a). It must be understood that usually a large buffer may be required to store all the samples for calculating the standard deviation and hence may involve a lot of computation using a standard formula of calculating the standard deviation. Therefore, in order to minimize the memory usage and the computations, the data processing module 305 may utilize following formula to calculate the standard deviation:

$$\sigma_n^2 = \frac{(n-1)\sigma_{n-1}^2 + (x_n - \bar{x}_{n-1})(x_n - \bar{x}_n)}{n} \quad (3)$$

Where, 'n' is the sample size.

In one embodiment, the data processing module 305 may compare the standard deviation calculated with the pre-defined standard deviation value. In one embodiment, if the standard deviation of the first filtered motion data on the at least one axis is more than the pre-defined standard deviation value, the data processing module 305 may determine that the motion detection device 101 is in motion. The data transmission module 306 may continue to transmit the first filtered motion data and the second filtered motion data to the data processing device 102 until a standard deviation of the first filtered motion data on the at least one axis is determined to be less than the pre-defined standard deviation value. In one embodiment, if the standard deviation of the first filtered motion data on the at least one axis is less than the pre-defined standard deviation value, the data processing module 305 may determine that the motion/movement of the motion detection device 101 is stopped/ceased.

In one embodiment, based upon the stopping of the motion/movement of the motion detection device 101, the data processing module 305 may calculate steady-state values corresponding to the at least one axis. The steady-state values may be calculated based upon the first filtered motion data and the second filtered motion data. The steady-state values may be calculated because if the orientation of the motion detection device 101 changes, the first filtered motion data and the second filtered motion data may also be changed. Even if the motion detection device 101 is not in motion, the accelerometer 203(a) may be under the influence of earth's gravitational field and the magnetometer 203(b) may be under the influence of earth's magnetic field. The steady-state values may provide the values from the accelerometer 203(a) as well as from the magnetometer 203(b) under the influence of the above-mentioned fields. Specifically, the steady state values may enable in offsetting the filtered motion data as indicated in equation (5) as described below. In one embodiment, the data processing module 305 may calculate steady-state values corresponding to the at least one axis using following formula:

$$x_{SS}[n] = \frac{1}{N} \sum_{k=0}^{N-1} x[n-k] \quad (4)$$

Where, 'N' is the number of values to average.

In one embodiment, the data transmission module 306 may transmit the steady-state values to the data processing device 102. The steady-values in combination with the first filtered motion data and the second filtered motion data may facilitate in determining the status of the motion detection device 101 via the data processing device 102. After transmitting the steady-state values, the microprocessor 202 and the magnetometer 203(b) may switched back to the sleep mode in order to conserve power.

Figure 4:
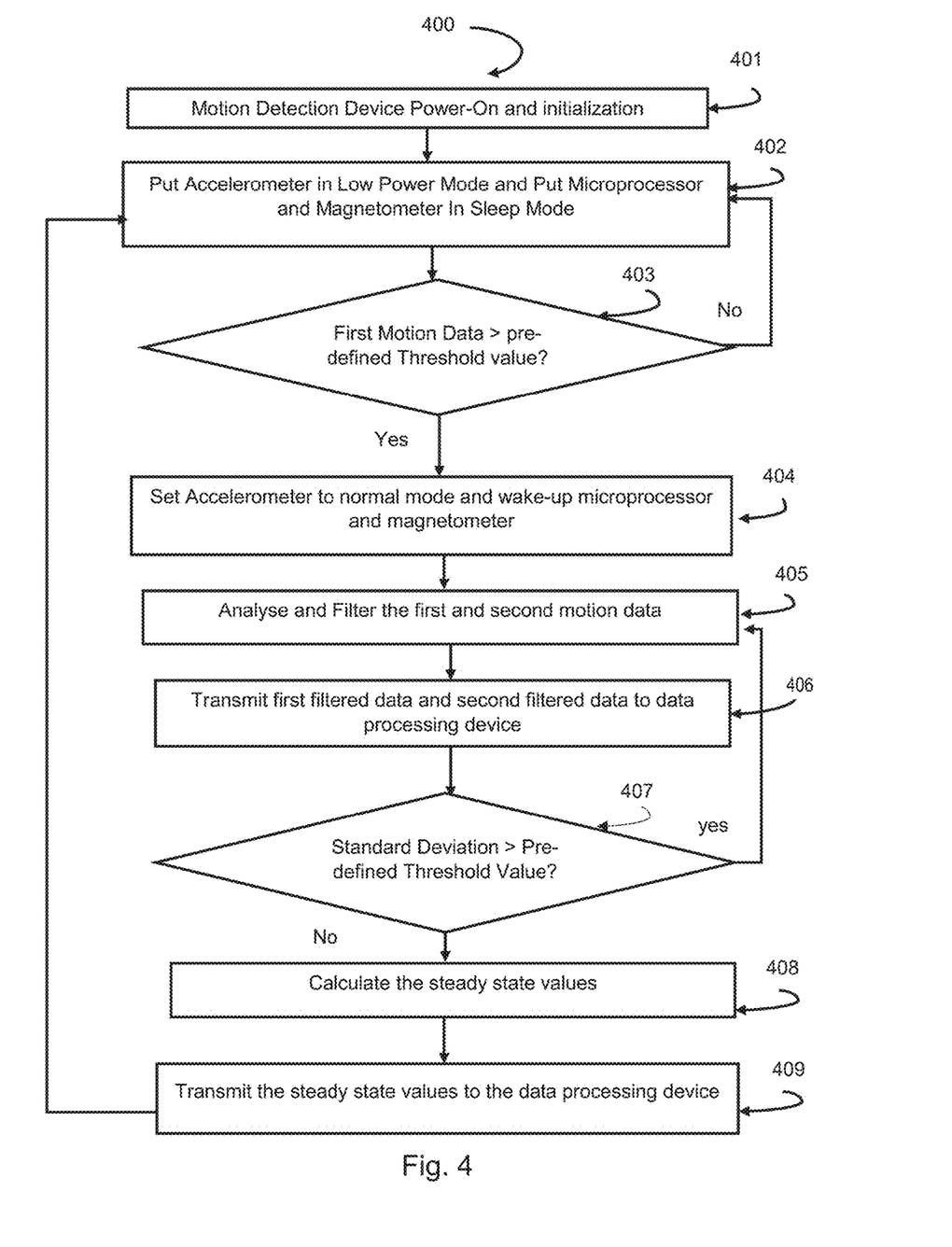
FIG. 4 illustrates a method 400 implemented by the motion detection device 101, in accordance with an embodiment of the present application.

Now referring to FIG. 4, a method 400 implemented by the motion detection device 101 is illustrated, in accordance with the embodiment of the present subject matter.

At block 401, the motion detection device 101 may be powered on and initialized.

At block 402, in order to extend the battery life and to reduce the power consumption, if there is no motion detected within the motion detection device 101, the magnetometer 203(b) and the microprocessor 202 may be operated in a sleep mode. The accelerometer 203(a), though active, may be operated in a low-power mode with lower sampling rate to minimize the power consumption.

At block 403, the first motion data captured from the first sensor (i.e. accelerometer 203(a)) may be compared with a pre-defined threshold value. If the first motion data is less than the pre-defined threshold value, then the accelerometer 203(a) may be continued to operate in the low power mode while the magnetometer 203(b) and the microprocessor 202 may be operated in the sleep mode.

At block 404, if the first motion data from the accelerometer 203(a) is more than the pre-defined threshold value, the accelerometer 203(a) may be operated in a normal mode and the magnetometer 203(b) and the microprocessor 202 may be triggered for capturing second motion data and execution of the modules 303 respectively. The data retrieving module 304 may retrieve the first motion data and the second motion data from the accelerometer 203(a) and the magnetometer 203(b) respectively, wherein the first motion data and the second motion data may be associated to motion of the motion detection device along at least one axis.

At block 405, the data processing module 305 may process the plurality first motion data and the second motion data of motion data. The data processing module 305 may filter noise data from the first motion data and the second motion data to generate a first filtered motion data and a second filtered motion data respectively. In one embodiment, the data processing module 305 may perform low-pass filtering on the plurality of first motion data fetched from the accelerometer 203(a) in order to minimize the effect of noise on the plurality of motion data. The noise data from the first motion data may be filtered based upon an Infinite Impulse Response (IIR) filtering technique implementing the aforementioned formula (1). Similarly, the data processing module 305 may filter the noise data from the second filtered data based upon moving average filtering technique implementing aforementioned formula (2).

At block 406, the data transmission module 306 may transmit the first filtered motion data and the second filtered motion data to the data processing device 102.

At block 407, the data processing module 305 may verify whether a standard deviation of the first filtered motion data corresponding to the at least one axis received from the accelerometer 203(a) is less than or greater than a pre-defined standard deviation value. In one embodiment, the data processing module 305 may calculate the standard deviation using the aforementioned formula (3). In one embodiment, if the standard deviation of is more than the pre-defined standard deviation value, then the motion detection device 101 may be considered to be still in motion and the method proceeds to the block 406. It must be noted that the data transmission module 306 may continue to transmit the first filtered motion data and the second filtered motion data to the data processing device 102 until a standard deviation of the first filtered motion data on the at least one axis becomes less than the pre-defined standard deviation value. In one embodiment, the motion of the motion detection device 101 may be determined to be stopped if the standard deviation is less than the predefined standard deviation value and the method proceeds to the block 408.

At block 408, the data processing module 305 may calculate steady-state values corresponding to the at least one axis. The steady-state values may be calculated based upon the first filtered motion data and the second filtered motion data. In one embodiment, the steady-state values corresponding to the at least one axis may be calculated using the aforementioned formula (4).

At block 409, the data transmission module 306 may transmit the steady-state values to the data processing device 102. The steady-values in combination with the first filtered motion data and the second filtered motion data may facilitate the data processing device 102 to determine status of the motion detection device 101. After transmitting the steady-state values, the microprocessor 202 and the magnetometer 203(b) may be switched back to the sleep mode in order to conserve power.

Figure 5:
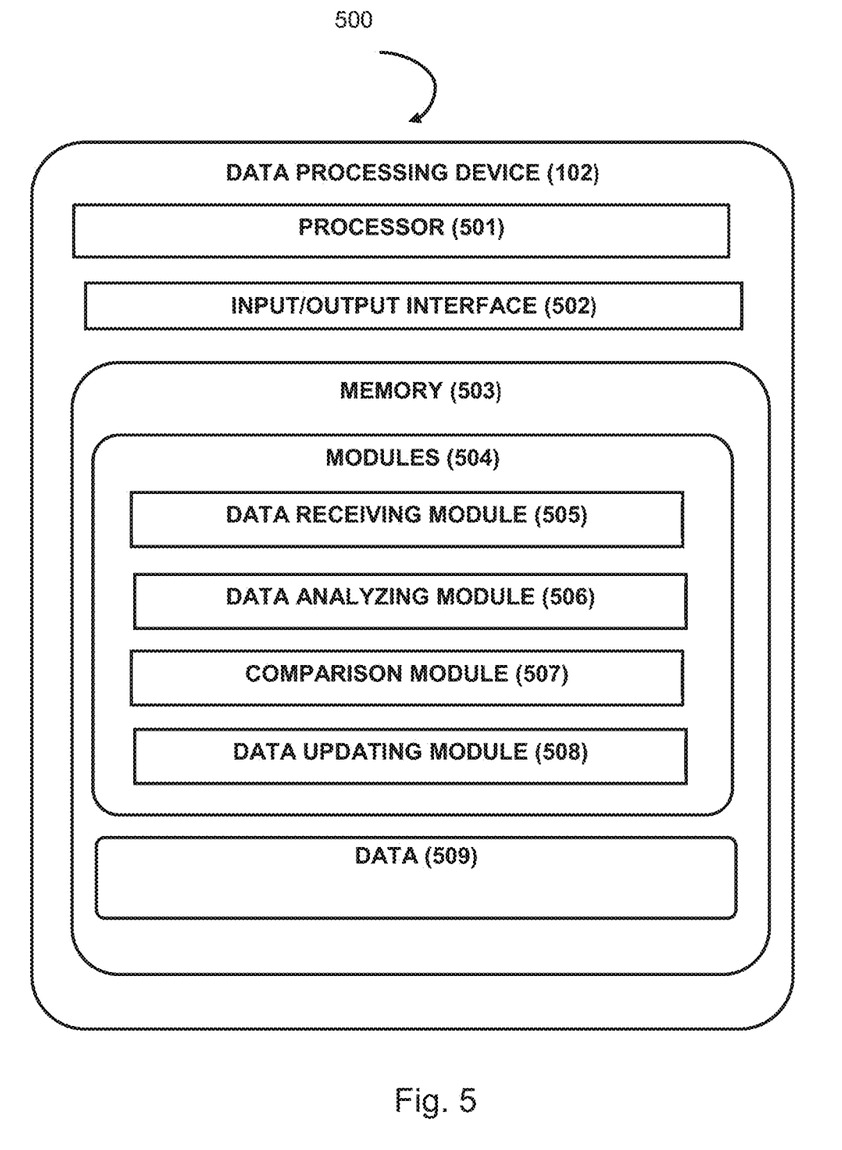
FIG. 5 illustrates an architecture of the data processing device 102, in accordance with an embodiment of the present application.

Now referring to FIG. 5, an architecture of the data processing device 102 is illustrated, in accordance with the embodiment of the present subject matter. The data processing device 102 may include at least one processor 501, an input/output (I/O) interface 502, a memory 503, modules 504 and data 509. In one embodiment, the at least one processor 501 is configured to fetch and execute computer-readable/programmed instructions stored in the memory 503.

In one embodiment, the I/O interface 502 may include a variety of software and hardware interfaces, for example, a web interface, a graphical user interface, and the like. The I/O interface 502 may allow the data processing device 102 to interact with the server 103. Further, the I/O interface 502 may enable the data processing device 102 to communicate with other computing devices, such as web servers and external data servers (not shown). The I/O interface 502 can facilitate multiple communications within a wide variety of networks and protocol types, including wired networks, for example, Local Area Network (LAN), cable, etc., and wireless networks/protocols, such as Wireless Local Area Network (WLAN), cellular, or satellite, IEEE 802.15.4 or Bluetooth Low Energy (BLE), or the like. The I/O interface 502 may include one or more ports.

In an implementation, the memory 503 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and memory cards. The memory 503 may include the modules 504 and the data 509.

In one embodiment, the modules 504 includes routines, programs, objects, components, data structure, etc., which performs particular tasks, functions or implement abstract data types. In one implementation, the modules 504 may include a data receiving module 505, a data analyzing module 506, a comparison module 507 and a data updating module 508.

In one embodiment, the data receiving module 505 may receive the first filtered motion data, the second filtered motion data and the steady-state values associated to motion of the motion detection device 101 along at least one axis from the motion detection device 101.

In one embodiment, the first filtered motion data and the second filtered motion data may be received at multiple time slots, and wherein at a first time slot the first filtered motion data and the second filtered motion data are received in 16-bit format from the motion detection device 101. However, for a second-time slot and subsequent time slots thereafter, difference of the first filtered motion data captured at a current time slot and the first filtered motion data captured at a previous time slot may only be received from the motion detection device 101. Similarly, for the second-time slot and the subsequent time slots thereafter, difference of the second filtered motion data captured at the current time slot and the second filtered motion data captured at the previous time slot may be received from the motion detection device 101.

In one embodiment, the data analyzing module 506 may analyze the first filtered motion data, the second filtered motion data and the steady-state values in order to determine the status of the motion detection device 101. The status of the motion detection device 101 may include, but not limited to, open, close, moved, or the like. The details of analysis of the first filtered motion data, the second filtered motion data and the steady-state values to determine the status of the motion detection device 101 is further explained hereinafter.

In one embodiment, the data analyzing module 506 may normalize the first filtered motion data by subtracting the steady-state values from the first filtered motion data along the at least one axis to obtain normalized filtered motion data. The normalization may remove the effect of gravitation field thereby obtaining the normalized filtered motion data. The normalization of the first filtered motion data may be performed by using the following formula:

$$x''[n]=x'[n]-x_{SS} \qquad (5)$$

Where, x"[n] is the normalized filtered motion data,
x'[n] is the first filtered motion data and
$x_{SS}$ is the steady-state value for the corresponding axis, wherein the steady-state value enables in offsetting the first filtered motion data.

In one embodiment, the data analyzing module 506 may further calculate a velocity and a displacement based upon the normalized filtered motion data along the at least one axis. The velocity v[n] and the displacement s[n] on the time-slot 'n' along each axis may be calculated using the following formulae with the assumption that the velocity is zero when the motion detection device 101 is stationary.

$$v[n]=v[n-1]+x''[n]\times\Delta t \qquad (6)\text{ and}$$

$$s[n]=s[n-1]+v[n-1]\times\Delta t+(v[n]-v[n-1])/2\times\Delta t \qquad (7)$$

Wherein,
x"[n] is the normalized filtered motion data,
v[n] is the velocity at time-slot n,
s[n] is the displacement at time-slot n, and
Δt is a length of each time-slot which is equal to 1/sampling frequency.

In one embodiment, the comparison module 507 may compare the displacement on the at least one axis with a pre-defined displacement threshold value in order to determine type of motion of the motion detection device 101. In one embodiment, if the displacement along only one of the multiple axes is greater than the pre-defined displacement threshold value, the motion of the motion detection device 101 may be determined as the linear motion. Alternatively, if the displacement along more than one axis of the multiple axes is greater than the pre-defined displacement threshold value, then the motion of the motion detection device 101 may be determined as the angular motion. The determination of the angular motion may indicate the data analyzing module 506 to check the second filtered motion data in order to improve the accuracy of the motion detection.

In one embodiment, the comparison module 507 may verify whether a difference between a last value in the second filtered motion data and the steady-state values along the at least one axis is greater than a pre-defined threshold value. In one embodiment, the data analyzing module 506 may validate the movement of the motion detection device 101 if the difference between the last value in the second filtered data and the steady state values is greater than the pre-defined threshold value. The magnetometer 203(b) may measure the earth's magnetic field and provides the second filtered motion data in all the three axes (i.e. x, y and z). The second filtered motion data may not change if the motion of the motion detection device 101 is detected as linear. It must be noted that the second filtered motion data may change when the motion detection device is rotated. Therefore, the motion detection device is determined to be rotated only when the second filtered motion data changes more than the predefined threshold value thereby validating the movement of the motion detection device 101.

In one embodiment, the data updating module 508 may update a change in the status of the motion detection device 101 based upon the validation of the movement of the motion detection device 101. In one embodiment, the change in status of the motion detection device 101 may updated to a user on a user device 104 of the user via a backend server 103 coupled with the data processing device 102. The change in status of the motion detection device 101 may include, but not limited to, open, close, moved, or the like.

Figure 6:
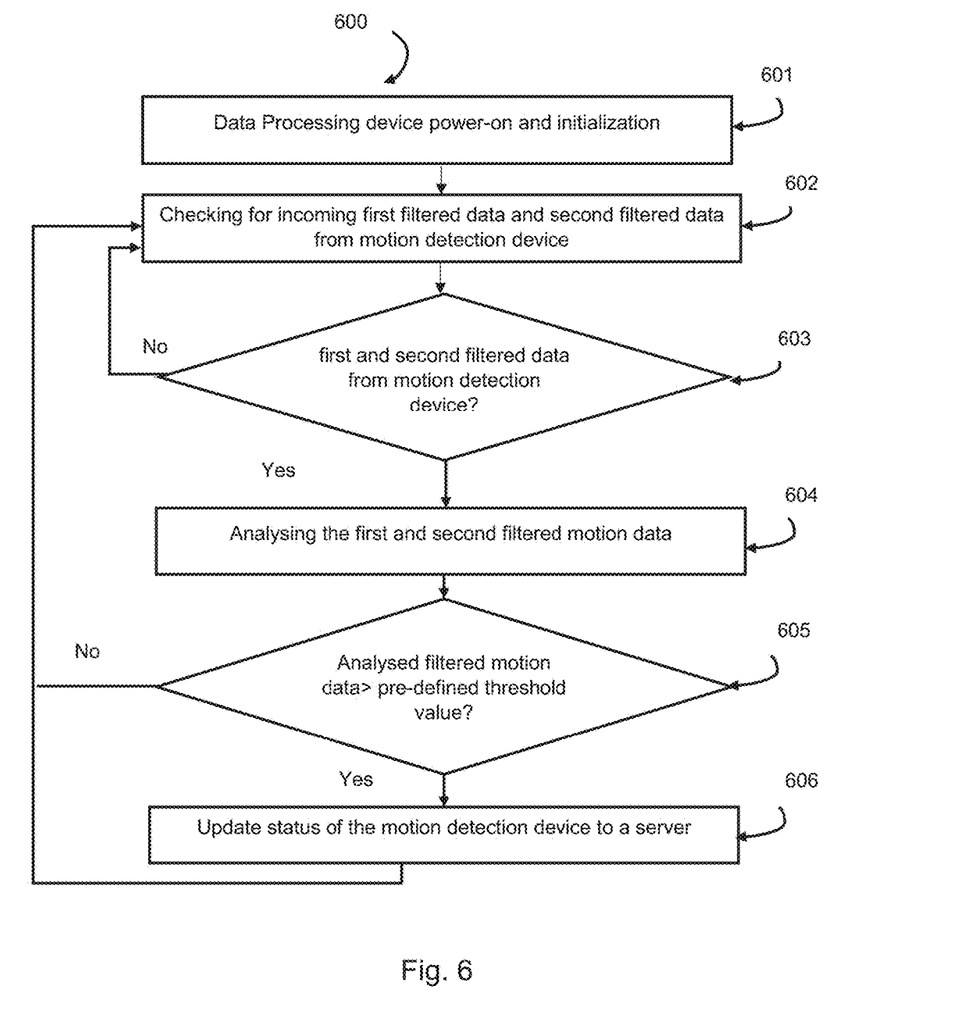
FIG. 6 illustrates a method 600 implemented by the data processing device 102, in accordance with an embodiment of the present application.

Now referring to FIG. 6, a method 600 implemented by the data processing device 102 is illustrated, in accordance with the embodiment of the present subject matter.

At block 601, the data processing device 102 may be powered on and initialized.

At block 602, the data processing device 102 may check the incoming first filtered motion data and the second filtered motion data from the motion detection device 101.

At block 603, if the first filtered motion data and the second filtered motion data is not received from the motion detection device 101, the data processing device 102 may continue to check for the incoming first filtered motion data and the second filtered motion data at block 602. Alternatively, if the first filtered motion data and the second filtered motion data is received, the method proceeds to block 604.

At block 604, the data analyzing module 506 may analyze the first filtered motion data, the second filtered motion data and the steady-state values in order to determine the status of the motion detection device 101. The status of the motion detection device 101 may be such as but are not limited to open, close, moved, or the like.

At block 605, the comparison module 507 may verify whether a difference between a last value in the second filtered motion data and the steady-state values along the at least one axis is greater than a pre-defined threshold value. In one embodiment, the data analyzing module 506 may validate the movement of the motion detection device if the difference between the last value in the second filtered data and the steady state values is greater than the pre-defined threshold value. In one embodiment, if the difference between the last value in the second filtered data and the steady-state values is less than the pre-defined threshold value, then the method proceeds to block 602.

At block 606, if the difference between the last magnetometer 203(*b*) value and the steady-state values is greater than the pre-defined threshold value, the data updating module 508 may be updated with a change in the status of the motion detection device 101 based upon the validation of the movement of the motion detection device 101. In one embodiment, the change in status of the motion detection device 101 may updated to a user on a user device 104 of the user via a backend server 103 coupled with the data processing device 102. The change in status of the motion detection device 101 may include, but not limited to, open, close, moved, or the like.

Figure 7:
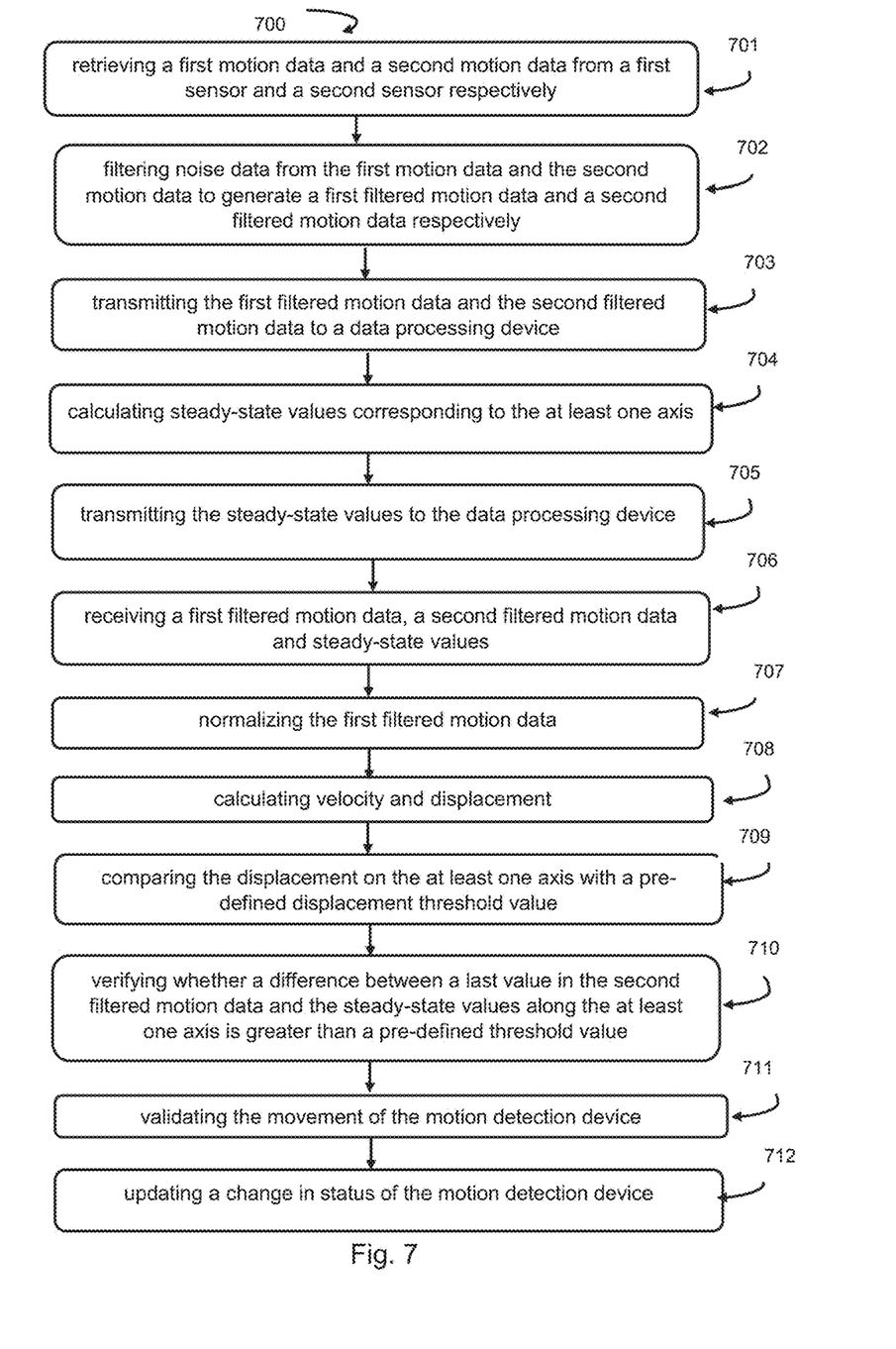
FIG. 7 illustrates a method 700 of wireless motion monitoring, in accordance with an embodiment of the present application.

Now referring to FIG. 7, a method 700 of wireless motion monitoring is illustrated, in accordance with the embodiment of the present subject matter.

At block 701, a first motion data and a second motion data may be retrieved from a first sensor and a second sensor respectively. In one implementation, the data retrieving module 304 may retrieve the first motion data and the second motion data from the accelerometer 203(*a*) and the magnetometer 203(*b*) respectively. The first motion data and the second motion data may be associated to motion of the motion detection device along at least one axis.

At block 702, noise data from the first motion data and the second motion data may be filtered to generate a first filtered motion data and a second filtered motion data respectively. In one implementation, the noise data from the first motion data and the second motion data may be filtered via the data processing module 305.

At block 703, the first filtered motion data and the second filtered motion data may be transmitted to the data processing device 102. In one implementation, the first filtered motion data and the second filtered motion data may be transmitted via the data transmission module 306.

At block 704, steady-state values corresponding to the at least one axis may be calculated. In one implementation, the steady-state values corresponding to the at least one axis may be calculated via the data processing module 305.

At block 705, the steady-state values may be transmitted to the data processing device 102. In one implementation, the steady-state values may be transmitted via the data transmission module 306.

At block 706, the first filtered motion data, the second filtered motion data and the steady-state values may be received at the data processing device 102. In one implementation, the first filtered motion data, the second filtered motion data and the steady-state values may be received via the data receiving module 505.

At block 707, the first filtered motion data may be normalized to obtain normalized filtered motion data. In one implementation, the first filtered motion data may be normalized via the data analyzing module 506.

At block 708, velocity and a displacement may be calculated based upon the normalized filtered motion data along the at least one axis. In one implementation, velocity and the displacement may be calculated via the data analyzing module 506.

At block 709, the displacement on the at least one axis may be compared with a pre-defined displacement threshold value. In one embodiment, the comparison module 507 may compare the displacement on the at least one axis with the pre-defined displacement threshold value in order to determine type of motion of the motion detection device 101.

At block 710, the comparison module 507 may verify whether a difference between a last value in the second filtered motion data and the steady-state values along the at least one axis is greater than a pre-defined threshold value.

At block 711, the data analyzing module 506 may validate the movement of the motion detection device if the difference between the last value in the second filtered data and the steady state values is greater than the pre-defined threshold value.

At block 712, change in status of the motion detection device may be updated. In one embodiment, the data updating module 508 may be updated with a change in the status of the motion detection device 101 based upon the validation of the movement of the motion detection device 101. In one embodiment, the change in status of the motion detection device 101 may updated to a user on a user device 104 of the user via a backend server 103 coupled with the data processing device 102.

Figure 8:
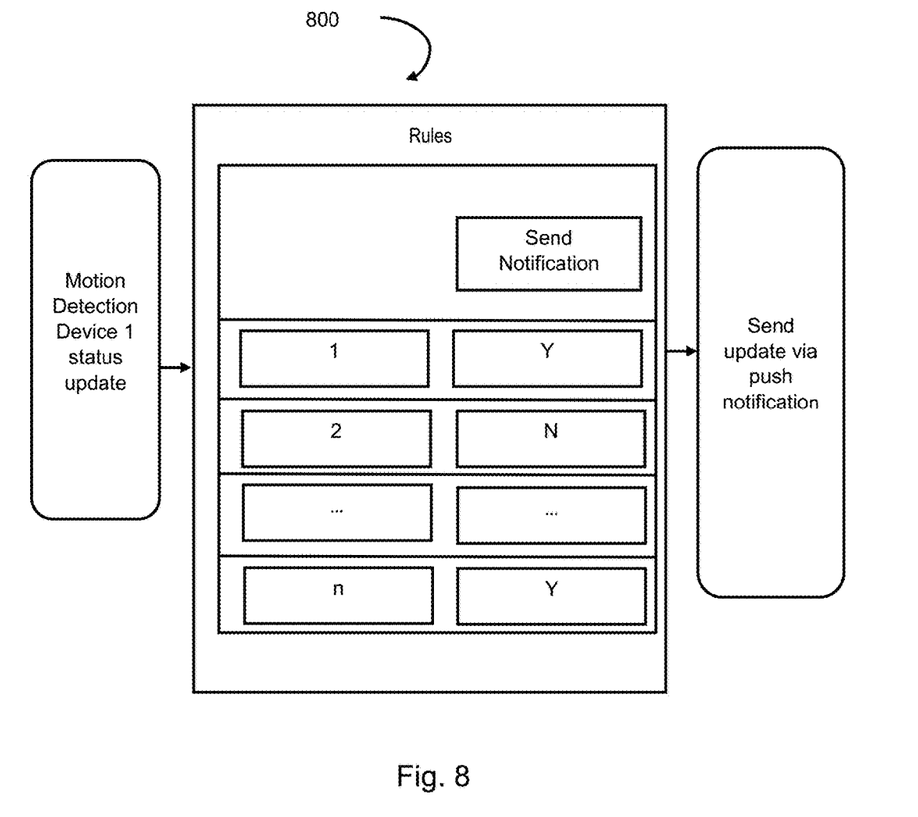
FIG. 8 illustrates a server 103 configured to notify the user with statuses of the motion detection device, in accordance with an embodiment of the present application.

Referring to FIG. 8, the server 103 configured to notify the user with statuses of the motion detection device is illustrated, in accordance with an embodiment of the present application. The server 103 may store the statuses of the motion detection device 101 for all premises. Therefore, the user may be provided with the most updated statuses of the motion detection device 101 via the server 103. The server 103 may store a set of rules pre-configured by the user. When there is an update of the status of the motion detection device 101, the programmed instructions executed on the server 103 may check against the rules and send push notification or SMS to pre-registered user devices 104 in order to alert the user accordingly.

Figure 9:
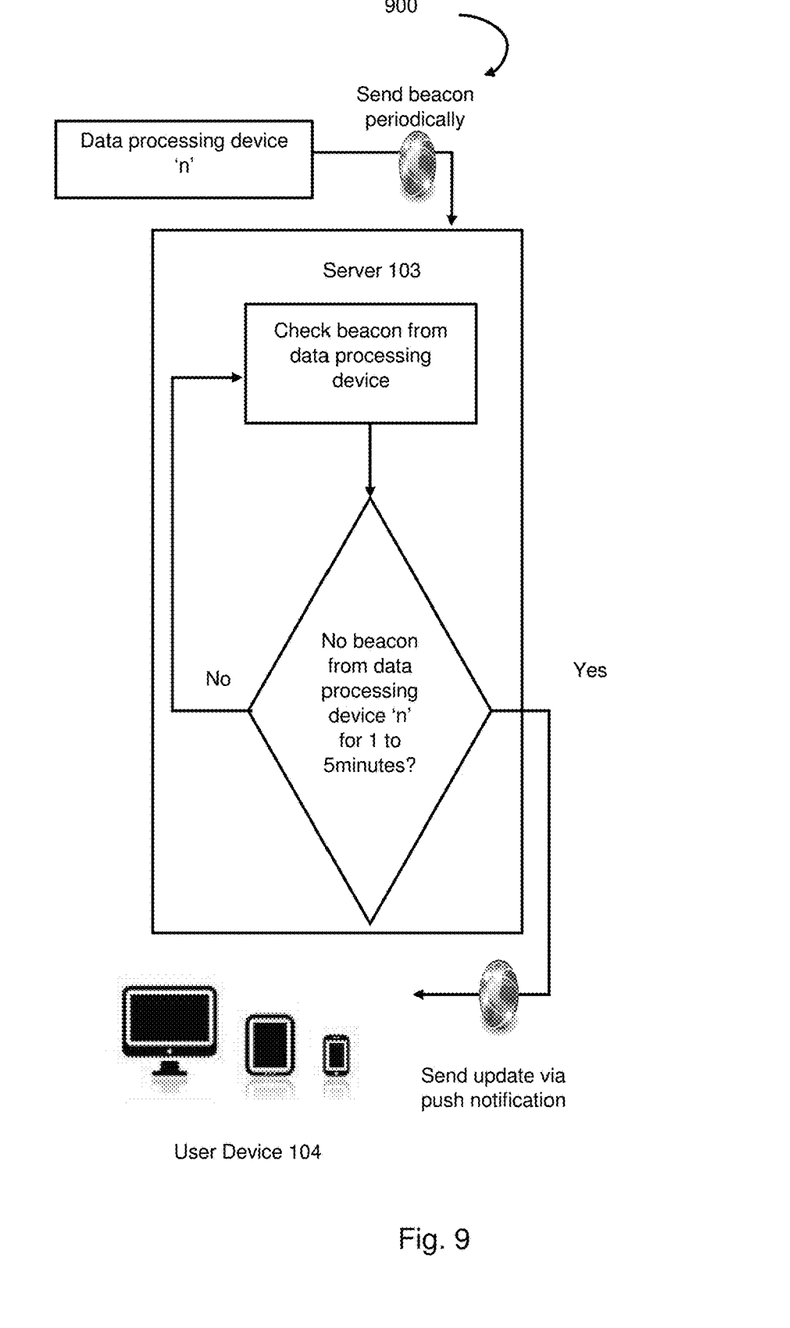
FIG. 9 illustrates a communication between the data processing device 102 and the server 103, in accordance with an embodiment of the present application.

Referring to FIG. 9, a communication between the data processing device 102 and the server 103 is illustrated, in accordance with an embodiment of the present application. In order to improve the reliability of the system, the server 103 may keep track of the statuses of the data processing device 102. The data processing device 102 may send beacon to the server 103 at a regular interval in the range of one to five minutes. The server 103 may stop receiving beacon if there is an intrusion and the power of the data processing device 102 is unplugged or it is forcefully removed or the Internet connection is interrupted. The server 103 may keep track of these beacons to monitor the data processing device 102 and may send alert messages to users with push notification or SMS. In addition, the users may be able to check all the alert messages when connecting to the server 103 for status enquiry.

Although implementations for wireless motion monitoring systems and methods have been described in language specific to structural features and/or methods, it is to be understood that the appended claims are not necessarily limited to the specific features or methods described. Rather, the specific features and methods are disclosed as examples of implementations for wireless motion monitoring systems.

The embodiments, examples and alternatives of the preceding paragraphs or the description and drawings, including any of their various aspects or respective individual features, may be taken independently or in any combination. Features described in connection with one embodiment are applicable to all embodiments, unless such features are incompatible.

What is claimed is:

1. A wireless motion monitoring method, comprising:
    retrieving, via a microprocessor of a motion detection device, a first motion data and a second motion data from a first sensor and a second sensor respectively, wherein the first motion data and the second motion data are associated to motion of the motion detection device along at least one axis;
    filtering, via the microprocessor, noise data from the first motion data and the second motion data to generate a first filtered motion data and a second filtered motion data respectively;
    transmitting, via the microprocessor, the first filtered motion data and the second filtered motion data to a data processing device in communication with the motion detection device, wherein the first filtered motion data and the second filtered motion data are transmitted until the motion of the motion detection device is determined to be stopped;
    calculating, via the microprocessor, steady-state values corresponding to the at least one axis after the motion of the motion detection device is stopped, wherein the steady-state values are calculated based upon the first filtered motion data and the second filtered motion data;
    transmitting, via the microprocessor, the steady-state values to the data processing device;
    receiving, via a processor of the data processing device, the first filtered motion data, the second filtered motion data and the steady-state values associated to motion of the motion detection device along at least one axis;
    verifying, via the processor, whether a difference between a last value in the second filtered motion data and the steady-state values along the at least one axis is greater than a pre-defined threshold value;
    validating, via the processor, the movement of the motion detection device if the difference between the last value in the second filtered data and the steady state values is greater than the pre-defined threshold value; and
    updating, via the processor, a change in status of the motion detection device based upon the validation of the movement of the motion detection device.

2. The wireless motion monitoring method of claim 1, wherein the first filtered motion data and the second filtered motion data are transmitted at multiple time slots, and wherein at a first time slot the first filtered motion data and the second filtered motion data are transmitted in 16-bit format to the data processing device.

3. The wireless motion monitoring method of claim 2, wherein for a second-time slot and subsequent time slots thereafter, difference of the first filtered motion data captured at a current time slot and the first filtered motion data captured at a previous time slot is transmitted from the motion detection device, and wherein for the second-time slot and the subsequent time slots thereafter, difference of the second filtered motion data captured at the current time slot and the second filtered motion data captured at the previous time slot is transmitted from the motion detection device.

4. The wireless motion monitoring method of claim 3 further comprising normalizing, via the processor, the first filtered motion data by subtracting the steady-state values from the first filtered motion data along the at least one axis to obtain normalized filtered motion data.

5. The wireless motion monitoring method of claim 4, wherein if displacement along only one of the multiple axes is greater than a pre-defined displacement threshold value, the motion of the motion detection device is determined as a linear motion, and wherein if the displacement along more than one axis of the multiple axes is greater than the pre-defined displacement threshold value, the motion of the motion detection device is determined as an angular motion.

6. The wireless motion monitoring method of claim 1 further comprising updating the change in status of the motion detection device to a user on a portable device of the user via a backend server coupled with the data processing device.

* * * * *